US011261812B2

(12) United States Patent
Cline et al.

(10) Patent No.: US 11,261,812 B2
(45) Date of Patent: *Mar. 1, 2022

(54) MODEL REFERENCE ADAPTIVE CONTROLLER

(71) Applicant: Rolls-Royce Corporation, Indianapolis, IN (US)

(72) Inventors: Curtis Harvey Cline, Brownsburg, IN (US); Stanislaw Zak, Lafayette, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/428,192

(22) Filed: May 31, 2019

(65) Prior Publication Data

US 2019/0316536 A1    Oct. 17, 2019

Related U.S. Application Data

(63) Continuation of application No. 15/336,546, filed on Oct. 27, 2016, now Pat. No. 10,309,330.

(51) Int. Cl.
  *F02D 41/14* (2006.01)
  *G05B 13/04* (2006.01)
  *F02D 41/26* (2006.01)

(52) U.S. Cl.
  CPC ......... *F02D 41/1402* (2013.01); *F02D 41/26* (2013.01); *G05B 13/041* (2013.01); *G05B 13/042* (2013.01); *F02D 2041/1433* (2013.01)

(58) Field of Classification Search
  CPC .................................................. G05B 41/26

(Continued)

(56) References Cited

U.S. PATENT DOCUMENTS 4,947,334 A    8/1990   Massey et al.
5,023,793 A    6/1991   Schneider et al.
(Continued)

OTHER PUBLICATIONS

Prosecution History from U.S. Patent Application No. 15/336,546, dated May 10, 2018, through Apr. 18, 2019, 83 pp.

(Continued)

*Primary Examiner* — Md Azad
(74) *Attorney, Agent, or Firm* — Shumaker & Sieffert, P.A.

(57) ABSTRACT

The disclosure describes a system that includes a closed-loop reference module, an adaptation module, and a control module. The closed-loop reference module is configured to execute a reference model that represents operation of an engine and determine a reference control signal and a reference state trajectory signal. The adaptation module is configured to determine an adaptation signal based on a difference between the reference state trajectory signal and an engine state trajectory signal representative of actual operation of the engine. The control module is configured to receive the reference control signal from the closed-loop reference module, the adaptation signal from the adaptation module, and the engine state trajectory signal. The control module is further configured to determine a demand signal based on the engine state trajectory signal, the adaptation signal, and the reference control signal, and output the demand signal to control operation of at least one engine component.

20 Claims, 5 Drawing Sheets

(58) Field of Classification Search
USPC .......................................................... 700/275
See application file for complete search history.

(56) References Cited

U.S. PATENT DOCUMENTS

| | | | |
|---|---|---|---|
| 5,078,345 A | 1/1992 | De Vries et al. | |
| 5,094,213 A | 3/1992 | Dudek et al. | |
| 5,105,372 A | 4/1992 | Provost et al. | |
| 5,189,620 A | 2/1993 | Parsons et al. | |
| 5,305,595 A | 4/1994 | Curran et al. | |
| 5,315,819 A | 5/1994 | Page et al. | |
| 5,732,676 A | 3/1998 | Weisman et al. | |
| 6,729,139 B2 | 5/2004 | Desai et al. | |
| 6,748,744 B2 | 6/2004 | Peplow et al. | |
| 6,789,390 B2 | 9/2004 | Hu et al. | |
| 6,823,675 B2 | 11/2004 | Brunell et al. | |
| 6,922,389 B1 | 7/2005 | Lundby | |
| 6,986,641 B1 | 1/2006 | Desai et al. | |
| 7,219,040 B2 | 5/2007 | Renou et al. | |
| 7,406,820 B2 | 8/2008 | Critchley et al. | |
| 7,530,232 B2 | 5/2009 | Certain | |
| 7,742,904 B2 | 6/2010 | Healy et al. | |
| 8,566,000 B2 | 10/2013 | Lickfold et al. | |
| 9,342,060 B2 | 5/2016 | Fuller et al. | |
| 10,240,544 B2 | 3/2019 | Zeller et al. | |
| 2002/0162317 A1 | 11/2002 | Banaszuk et al. | |
| 2003/0200069 A1 | 10/2003 | Volponi | |
| 2004/0088059 A1 | 5/2004 | Johnson et al. | |
| 2004/0123600 A1 | 7/2004 | Brunell et al. | |
| 2004/0176860 A1 | 9/2004 | Hovakimyan et al. | |
| 2005/0193739 A1 | 9/2005 | Brunell et al. | |
| 2007/0027688 A1 | 2/2007 | Kahn | |
| 2007/0055392 A1* | 3/2007 | D'Amato | G05B 13/048 700/44 |
| 2007/0073525 A1 | 3/2007 | Healy et al. | |
| 2007/0089697 A1* | 4/2007 | Hara | F02D 41/0002 123/90.15 |
| 2008/0060341 A1 | 3/2008 | Loisy | |
| 2008/0294305 A1 | 11/2008 | Roesch | |
| 2009/0037048 A1* | 2/2009 | Shin | G05D 19/02 701/36 |
| 2009/0090817 A1 | 4/2009 | Monka | |
| 2009/0216425 A1 | 8/2009 | Hay et al. | |
| 2010/0017093 A1 | 1/2010 | Mahmood | |
| 2010/0038158 A1 | 2/2010 | Whitney et al. | |
| 2010/0057297 A1 | 3/2010 | Itagaki et al. | |
| 2010/0153025 A1 | 6/2010 | Ling et al. | |
| 2010/0162718 A1 | 7/2010 | Bowman | |
| 2010/0241331 A1 | 9/2010 | Duke et al. | |
| 2011/0213507 A1 | 9/2011 | Dooley | |
| 2011/0230981 A1* | 9/2011 | Karpman | G05B 13/04 700/30 |
| 2012/0022838 A1 | 1/2012 | Bacic et al. | |
| 2012/0053735 A1 | 3/2012 | Tessier et al. | |
| 2012/0060505 A1 | 3/2012 | Fuller et al. | |
| 2012/0095658 A1 | 4/2012 | Yasui | |
| 2015/0007574 A1 | 1/2015 | Morgan et al. | |
| 2015/0267619 A1 | 9/2015 | Khalid | |
| 2016/0069277 A1* | 3/2016 | Meisner | F02C 9/52 60/773 |
| 2016/0208639 A1 | 7/2016 | Cai | |
| 2016/0208717 A1 | 7/2016 | Cai | |
| 2018/0119629 A1 | 5/2018 | Cline et al. | |

OTHER PUBLICATIONS

Communication under Rule 71(3) EPC from counterpart EP Application No. 17193361.7 dated Mar. 3, 2020, 46 pgs.
Behbahani et al., "Integrated Model-Based Controls and PHM for Improving Turbine Engine Performance, Reliability, and Cost", 45th AIAA/ASME/SAE/ASEE Joint Propulsion Conference & Exhibit, Aug. 2-5, 2009, 9 pgs.
Extended Search Report from counterpart European Application No. 17193361.7, dated Apr. 6, 2018, 9 pp.
Gibson, Closed-Loop Reference Model Adaptive Control: with Application to Very Flexible Aircraft, Massachusetts Institute of Technology, Feb. 2014, 152 pgs.
Lavretsky et al., "Robust and Adaptive Control with Aerospace Applications," Springer-Verlag, 2013 (Applicant points out, in accordance with MPEP 609.04(a), that the year of publication, 2013, is sufficiently earlier than the ffective U.S. filing date, 2016, so that the particular month of publication is not in issue.) 225 pp.
O'Brien et al., Performance Prediction and Simulation of Gas Turbine Engine Operation, Report of the RTO Applied Vehicle Technology Panel (AVT) Task Group, AVT-018, RTO Technical Report 44, 2002 [retrieved from http://ftp.rta.nato.int/public/PubFuiiText/RTO/TRIRTO-TR-044/TR-044-$$ALL.pdf] (pp. 1, 5-1 07). (Applicant points out, in accordance with MPEP 609.04(a), that the year of publication, 2002, is sufficiently earlier than the effective U.S. filing date, 2016, so that the particular month of publication is not in issue.).
Pakmehr et al., "Adaptive Control of Uncertain Systems with Gain Scheduled Reference Model," 2014 American Control Conference (ACC), Jun. 4-6, 2014, pp. 1322-1327.
Pakmehr et al., Model Reference Adaptive Control of Systems with Gain Scheduled Reference Models, math. OC, Mar. 15, 2014, 33 pgs.
Panov, "Model-Based Control and Diagnostic Techniques for Operational Improvements of Gas Turbine Engines", Proceedings of 10th European Conference on Turbomachinery Fluid dynamics & Thermodynamics, Apr. 15-19, 2013, 12 pgs.
Response to Search Report dated May 7, 2018, from counterpart European Application No. 17193361.7, filed Oct. 5, 2018, 71 pp.
Richter, "Advanced Control of Turbofan Engines," Springer, 2012, (Applicant points out, in accordance with MPEP 609.04(a), that the year of publication, 2012, is sufficiently earlier than the effective U.S. filing date, 2016, so that the particular month of publication is not in issue.) 129 pp.
U.S. Appl. No. 15/336,546, by Curtis Harvey Kline, et al., filed Oct. 27, 2016.
Prosecution History from U.S. Appl. No. 15/336,546, dated May 10, 2018 through Apr. 18, 2019, 83 pp.

* cited by examiner

MODEL REFERENCE ADAPTIVE CONTROLLER

RELATED APPLICATIONS

This application is a continuation of U.S. application Ser. No. 15/336,546, filed Oct. 27, 2016, which is incorporated herein by reference in its entirety.

TECHNICAL FIELD

The disclosure relates to power management of engines.

BACKGROUND

Gas turbine engine controllers are designed to satisfy both performance and safety requirements. To achieve this, engine control logic includes three primary functions: steady-state control, transient control, and limit protection. The steady-state control logic is designed to maintain output power at a demanded level in the presence of disturbances and uncertainties. The transient control logic is designed to safely transition the engine from one power level to another within performance requirements. The limit protection logic is designed to ensure that critical parameters never violate constraints. These functions are all integrated via loop selection logic.

In a typical power management loop, the power request is converted to a setpoint. The difference between the setpoint and the corresponding feedback signal is used to drive power management compensation, which ultimately produces a rate command that is output to the loop selection logic. The loop selection logic either passes the rate command through to a common integrator or selects a rate command that is appropriate for the current engine operating mode.

In order to develop control logic for steady-state control, transient control, and limit protection, linear point models may be used to approximate the gas turbine engine system. Specifically, control laws are developed and tuned in a computational environment in which linear point models are used to represent the engine dynamics. Development and tuning occurs for one linear point model at a time, and the resulting individual control laws are integrated together to form control logic satisfying both performance and operability requirements across the complete operating envelope of the engine. The controller is then tested on a non-linear engine system model where additional tuning is accomplished. Once modeling and simulation development is completed, bench and engine testing is conducted to fine tune and verify the control logic. All of the models used for control design generally represent a single engine condition.

If the control logic is to perform acceptably, it must safely accommodate nonlinearities and uncertainties not present in the design models. In addition, control logic must accommodate the effects of disturbances, manufacturing variations, and degradations that will be present in all of the components of the system. Conventional control logic accommodates these factors by implementing margins within the control logic design. However, this approach may reduce engine performance by not allowing the control logic to access engine states in these margins.

SUMMARY

In some examples, the disclosure describes a method that includes receiving, by a control module, from a closed-loop reference module, a reference control signal. The closed-loop reference module executes a reference model that represents operation of an engine. The method further includes receiving, by the control module, from an adaptation module, an adaptation signal. The adaptation module determines the adaptation signal based on a difference between a reference state trajectory signal output by the closed-loop reference module and an engine state trajectory signal representative of actual operation of the engine. The method further includes receiving, by the control module, the engine state trajectory signal. The method further includes determining, by the control module, a demand signal based on the engine state trajectory signal, the adaptation signal, and the reference control signal. The method further includes outputting, by the control module, the demand signal to control operation of at least one component of the engine.

In some examples, the disclosure describes a system that includes a closed-loop reference module, an adaptation module, and a control module. The closed-loop reference module is configured to determine a reference control signal and determine a reference state trajectory signal. The closed-loop reference module executes a reference model that represents operation of an engine. The adaptation module is configured to determine an adaptation signal based on a difference between the reference state trajectory signal and an engine state trajectory signal representative of actual operation of the engine. The control module is configured to: receive, from the closed-loop reference module, the reference control signal; receive, from the adaptation module, the adaptation signal; and receive the engine state trajectory signal. The control module is further configured to determine a demand signal based on the engine state trajectory signal, the adaptation signal, and the reference control signal, and output the demand signal to control operation of at least one component of the engine.

In some examples, the disclosure describes a computer-readable storage medium storing instructions that, when executed, may cause a processor to receive, by a control module, from a closed-loop reference module, a reference control signal. The closed-loop reference module executes a reference model that represents operation of an engine. The instructions may also cause the processor to receive, by the control module, from an adaptation module, an adaptation signal. The adaptation module determines the adaptation signal based on a difference between a reference state trajectory signal output by the closed-loop reference model and an engine state trajectory signal representative of actual operation of an engine. The instructions may also cause the processor to: receive, by the control module, the engine state trajectory signal; determine, by the control module, a demand signal based on the engine state trajectory signal, the adaptation signal, and the reference control signal; and output, by the control module, to the engine, the demand signal to control operation of at least one component of the engine.

The details of one or more examples are set forth in the accompanying drawings and the description below. Other features, objects, and advantages of the disclosure will be apparent from the description and drawings, and from the claims.

DETAILED DESCRIPTION

Figure 1:
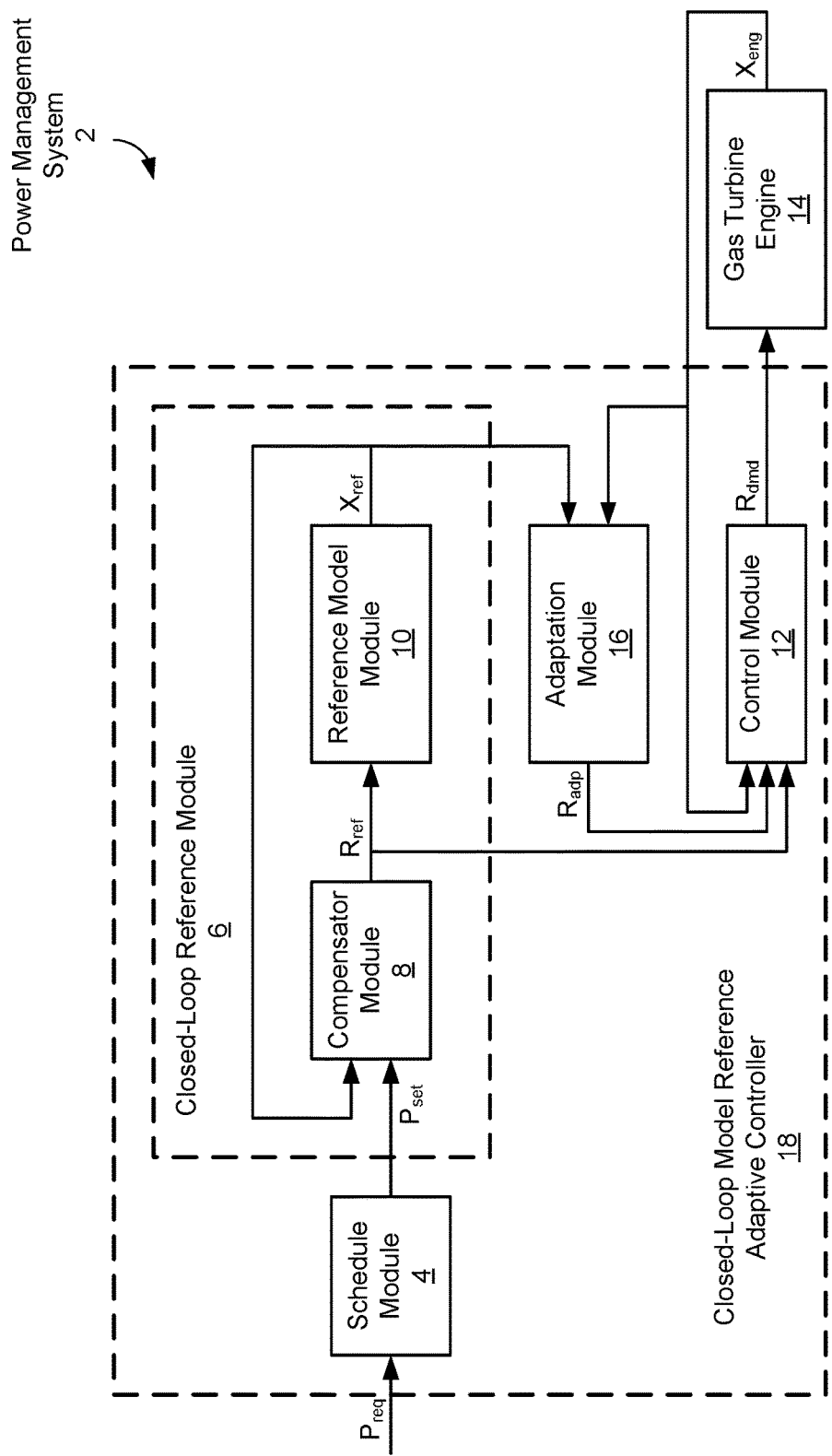
FIG. 1 is a conceptual and schematic block diagram illustrating an example power management system that includes a closed-loop model reference adaptive controller for controlling an engine.

The disclosure describes systems and techniques for managing operation of an engine. During engine operation, engine performance may deviate from modeled performance used to develop the control laws that control operation of the engine. These deviations introduce control error into the engine control system. The systems and techniques described below utilize outputs from a reference model of the performance of the engine to adjust engine control signals and engine control and adaptation laws to more accurately relate a requested setpoint to a control signal, which may allow operational margins of the engine to be reduced.

A controller may include a control module, a closed-loop reference module, and an adaptation module. The control module receives signals from the closed-loop reference module, the adaptation module, and sensors on the engine and outputs a demand signal based on control laws and the signals. For example, the closed-loop reference module may output a reference control signal related to a power demand, the adaptation module may output an adaptation signal related to engine model uncertainty, and the sensors on the engine may output an engine state trajectory signal related to actual engine operation. The control module determines the demand signal based on the engine state trajectory signal, the adaptation signal, and the reference control signal. The control module outputs the demand signal to control operation of at least one component of the engine. In some examples, the engine is a gas turbine engine.

In some examples, the closed-loop reference module determines the reference control signal based on a power request signal and a reference state trajectory signal. The closed-loop reference module includes a reference model that simulates the response of the engine to the reference control signal and outputs the response as the reference state trajectory signal. The closed-loop reference module uses the reference state trajectory to further adjust the reference control signal for a desired gas turbine engine response to the power demand. By determining the reference control signal based on modeled engine information, the closed-loop reference module provides the control module with a modeled reference control signal that represents the ideal control signal and is used as the baseline to help the closed-loop model reference adaptive controller account for disturbances or variations present in the engine system.

The adaptation module may determine the adaptation signal based on a difference between the reference state trajectory signal representing modeled engine operation and the engine state trajectory signal representing actual engine operation. By determining the adaptation signal based on the difference between the reference state trajectory signal and the engine state trajectory signal, the adaptation module provides the control module with information that may be used to adjust the demand signal to the engine for disturbances, manufacturing variations, and degradations in the performance of the engine, which causes the actual engine operation to diverge from the modeled engine operation. For example, the adaptation module may help account for disturbances, manufacturing variations, and degradations in the performance of the engine that are not accounted for by the reference model implemented by the closed-loop reference module.

By using modeled engine information to adjust to changes in engine performance and control, the power management system described herein may be used to accommodate non-linearities, uncertainties, variations and degradations in gas turbine engine control and performance to enhance steady-state and transient performance while maintaining safe operation. For example, the control module described above may use control laws that operate under smaller control margins for the demand signal of variables such as fuel flow, as both the reference control signal and adaptation signal take into account modeled responses that reduce the likelihood of deviations from design. By reducing control margins, gas turbine engine may operate at a higher or more efficient level of performance.

In some examples, the power management system may further include a model-based engine module to estimate at least one unmeasured parameter of the gas turbine engine, such as specific fuel consumption or compressor surge margin. The adaptation module may receive the unmeasured engine parameter signal and adapt the controller to account for changes in performance of the gas turbine engine and cause the estimate of the unmeasured parameter to track the parameters reference model trajectory. The closed-loop model reference adaptive controller may more efficiently operate the gas turbine engine through its lifetime. In some examples, the power management system may be used with existing power management control hardware for steady-state operation, transient operation, limit protection of the gas turbine engine, or combinations thereof. In some examples, the power management system may be configured to control more than one component of the gas turbine engine, such as the fuel flow system or variable stator vane actuators. By integrating control of more than one engine control variable, the power management system may account for dependent variables for more accurate control.

FIG. 1 is a conceptual and schematic block diagram illustrating an example power management system 2 for an engine. Power management system 2 includes a closed-loop model reference adaptive controller (MRAC) 18 for controlling gas turbine engine 14. Although FIG. 1 will describe control of gas turbine engine 14, power management system 2 may be used to control operation of any type of engine. In some examples, closed-loop MRAC 18 includes a schedule module 4, a closed-loop reference module 6, a control module 12, and an adaptation module 16. In some examples, closed-loop reference module 6 may include compensator module 8 and reference model module 10. MRAC 18 and the modules included in MRAC 18 may be implemented, at least in part, in hardware, software, firmware, or any combination thereof. For example, MRAC 18 and the modules included in MRAC 18 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same physical device or within separate physical devices to support the various techniques described in this disclosure. In addition, any of the described units, modules or components may be implemented together or separately as discrete but interoperable logic devices.

Schedule module 4 may be configured to convert a demand request signal, $P_{req}$, to closed-loop MRAC 18 into a demand setpoint, $P_{set}$, for one or more engine control variables associated with the demand request signal, $P_{req}$. To perform this conversion, schedule module 4 may receive the demand request signal, $P_{req}$, determine a demand setpoint, $P_{set}$, based on the demand request signal, $P_{req}$, and output the demand setpoint, $P_{set}$, to compensator module 8. The demand request signal, $P_{req}$, may be a signal from, for example, a control system controlled by an operator of an aircraft requesting a selected power demand for gas turbine engine 14. The demand setpoint, $P_{set}$, may be an operational setpoint for an engine control variable associated with gas turbine engine 14.

Schedule module 4 may include a list or database of gain schedules calibrated for particular demand setpoints, $P_{set}$, of engine controlled variables. For example, schedule module 4 may receive a demand request signal, $P_{req}$, for a particular power level, look up a demand setpoint, $P_{set}$, for a shaft speed associated with the demand request signal, $P_{req}$, and output the demand setpoint, $P_{set}$, for the shaft speed. Engine controlled variables may include, but are not limited to shaft speeds, pressure ratios, and torque. In some examples, schedule module 4 may take into account operating conditions of gas turbine engine 14 when determining the demand setpoint, $P_{set}$. For example, if gas turbine engine 14 is in transient operation, schedule module 4 may use a different gain schedule than if gas turbine engine 14 was in steady-state operation.

Closed-loop reference module 6 may represent the system that acts on the demand setpoint(s), $P_{set}$, to produce a reference control signal, $R_{ref}$. Closed-loop reference module 6 may receive the demand setpoint, $P_{set}$, from schedule module 4, determine the reference control signal, $R_{ref}$, and a reference state trajectory signal, $X_{ref}$, based on the demand setpoint, $P_{set}$. Closed-loop reference module 6 may output the reference control signal, $R_{ref}$, to control module 12, and output the reference state trajectory signal, $X_{ref}$, to adaptation module 16. The reference state trajectory signal, $X_{ref}$, may represent the response of reference model module 10 to the reference control signal, $R_{ref}$. The reference control signal, $R_{ref}$, may represent a measurable, manipulated engine variable associated with gas turbine engine operation. Engine control variables may include, but are not limited to, fuel flow and air flow. Each measurable engine control variable may have an associated engine component that controls the measurable engine control variable. For example, fuel flow may be controlled by a fuel valve, while air flow may be controlled by variable stator vanes.

In some examples, closed-loop reference module 6 may include compensator module 8. Compensator module 8 may assist in maintaining the system stability and reducing control error by adjusting the reference control signal, $R_{ref}$, based on a closed-loop response received from reference model module 10. Compensator module 8 may receive the demand setpoint, $P_{set}$, from schedule module 4 and the reference state trajectory signal, $X_{ref}$, from reference model module 10. Compensator module 8 may determine the reference control signal, $R_{ref}$, based on the demand setpoint, $P_{set}$, and the reference state trajectory signal, $X_{ref}$. Compensator module 8 may output the reference control signal, $R_{ref}$, to reference model module 10.

Compensator module 8 may receive the reference state trajectory signal, $X_{ref}$, for a particular control reference signal and convert the reference state trajectory signal, $X_{ref}$, into an equivalent demand setpoint that would be expected for the particular reference control signal, $R_{ref}$. Compensator module 8 may adjust the reference state trajectory signal, $X_{ref}$, based on a difference between the demand setpoint, $P_{set}$, and the equivalent demand setpoint of the reference state trajectory signal, $X_{ref}$, to reduce the difference between the demand setpoint, $P_{set}$, and the equivalent demand setpoint.

In some examples, closed-loop reference module 6 may include reference model module 10. Reference model module 10 may represent an ideal reference model of gas turbine engine 14 that simulates a response of gas turbine engine 14 to the control reference signal. Compensator module 8 may use the response to further adjust the control reference signal. Reference model module 10 may receive the reference control signal, $R_{ref}$, from compensator module 8 and determine the reference state trajectory signal, $X_{ref}$, based on the reference control signal, $R_{ref}$. Reference model module 10 may output the reference state trajectory signal, $X_{ref}$, to compensator module 8 and adaptation module 16.

Reference model module 10 may simulate operation of gas turbine engine 14 using one or more reference models. Reference model module 10 may utilize any reference model capable of producing reference state trajectory signals, $X_{ref}$, of engine controlled variables, including multiple reference models over a range of operating conditions for gas turbine engine 14. Reference models that may be used include, but are not limited to, linear models such as piecewise linear models; nonlinear models such as nonlinear thermodynamic cycle models; and any other model capable of representing dynamic or steady-state performance of gas turbine engine 14. For example, a linear design model may be piecewise linear to handle changes in operating conditions. In other words, in some examples, the linear design model may be composed of multiple linear models, each linear model representing operation of gas turbine engine 14 over a portion of the operating range of gas turbine engine 14.

Compensator module 8 and reference model module 10 may operate together in a closed-loop, in which reference model module 10 outputs the reference state trajectory signal, $X_{ref}$, to compensator module 8, which adjusts the reference control signal, $R_{ref}$, based on the reference state trajectory signal, $X_{ref}$. Compensator module 8 may adjust the control reference signal to produce a reference state trajectory signal, $X_{ref}$, from reference model module 10 that is similar to or substantially the same as a desired operation of gas turbine engine 14. Compensator module 8 may be tuned across operating conditions based on the response to the reference state trajectory signal, $X_{ref}$, and continue to compensate for the reference state trajectory signal, $X_{ref}$, during operation of gas turbine engine 14. By operating in a closed loop, compensator module 8 may use modeled engine information to adjust the control reference signal upstream of control module 12.

Adaptation module 16 may be included in power management system 2 to determine error between actual engine operation and modeled engine operation and output a signal that allows control module 12 to compensate for this error. Error may include, for example, manufacturing variations in gas turbine engine 14 that deviate from the engine model, degradations in performance of gas turbine engine 14 over its life, and variations in sensors and actuators of the engine that may change over time. Adaptation module 16 includes a set of adaptation laws. The set of adaptation laws may be configured to generate an output, based on the trajectory difference between the reference state trajectory signal, $X_{ref}$, and the engine state trajectory signal, $X_{eng}$, to control module 12 to reduce or substantially cancel effects of uncertainties in power management system 2. Adaptation module 16 may receive the reference state trajectory signal, $X_{ref}$, from reference model module 10 and the engine state trajectory signal, $X_{eng}$, from gas turbine engine 14. In some examples, adaptation module 16 may receive a trajectory difference from a comparator, where the trajectory difference may represent a difference between the reference state trajectory signal, $X_{ref}$, from closed-loop reference module 6 and an engine state trajectory signal, $X_{eng}$, from gas turbine engine 14. The engine state trajectory signal, $X_{eng}$, may represent at least one engine control variable from actual operation of gas turbine engine 14. The adaptation module may determine the adaptation signal, $R_{adp}$, based on the trajectory difference between the reference state trajectory signal, $X_{ref}$, and the engine state trajectory signal, $X_{eng}$, and one or more adaptation laws. The adaptation signal, $R_{adp}$, may represent an adjustment to one or more control parameters of control module 12 based on the trajectory difference between the reference state trajectory signals, $X_{ref}$, and the engine state trajectory signal, $X_{eng}$. For example, the adaptation signal, $R_{adp}$, may be an adjustment to controller gain of control module 12.

Figure 4:
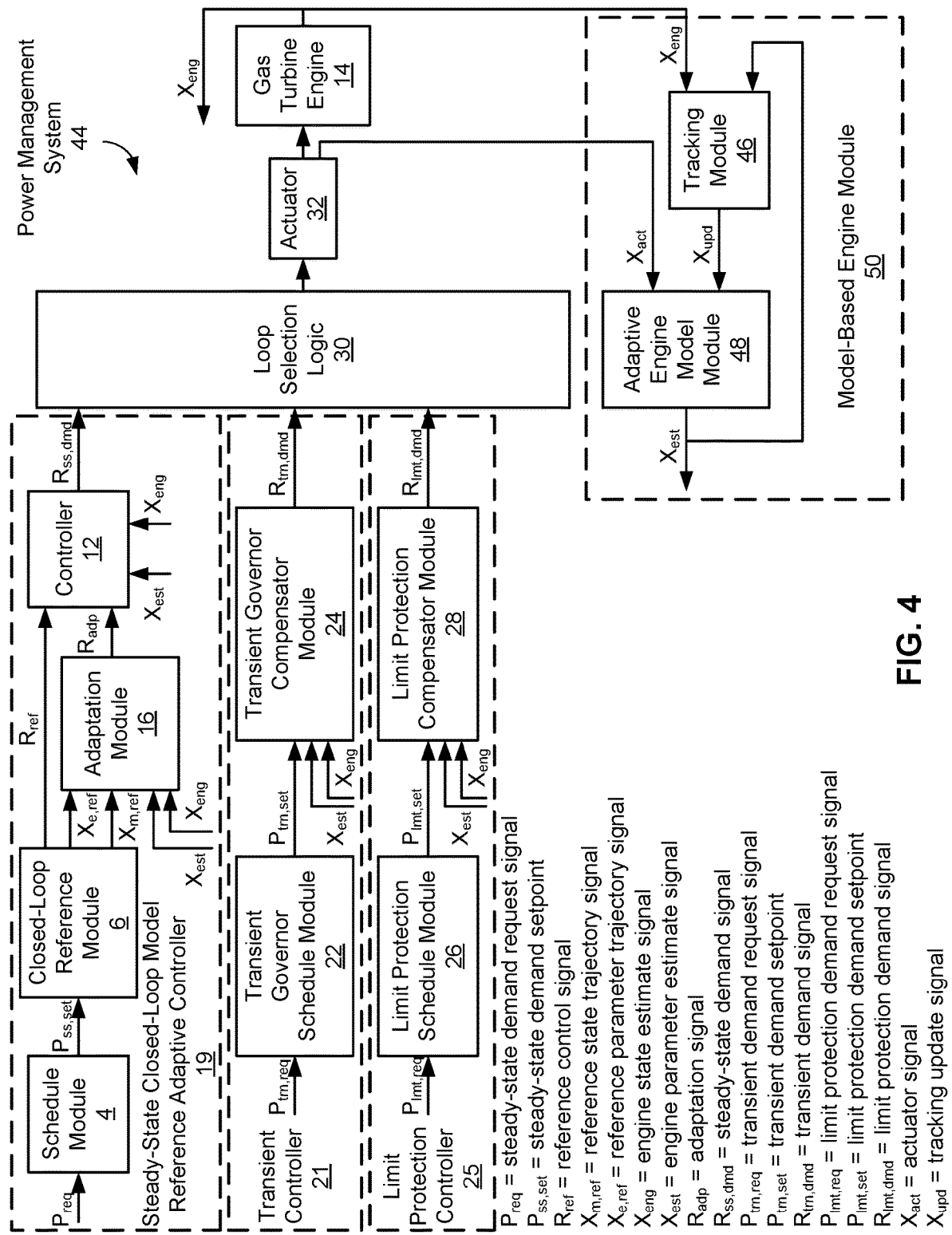
FIG. 4 is a conceptual and schematic block diagram illustrating an example power management system that includes a steady-state closed-loop model reference adaptive controller and a model-based engine module.

In addition to measured engine control variables, adaptation module 16 may be configured to receive unmeasured engine parameter estimates from, for example, a model-based engine module, which may be further described in FIG. 4. Adaptation module 16 may determine the adaptation signal, $R_{adp}$, based on the reference state trajectory signal, $X_{ref}$, the engine state trajectory signal, $X_{eng}$, and an unmeasured engine parameter estimate.

Control module 12 may receive a variety of engine signals, e.g. engine state trajectory signal, $X_{eng}$, engine parameter estimate signal (not shown), reference state trajectory signal, $X_{ref}$, reference control signal, $R_{ref}$, and adaptation signal, $R_{adp}$, operational mode signal (not shown) to generate a signal from those inputs to control actuators (not shown) for gas turbine engine 14 based on a set of control laws. The set of control laws may be algorithms and gain schedules with configurable parameters selected and configured to convert the reference control signal, $R_{ref}$, the adaptation signal, $R_{adp}$, and the engine state trajectory signal, $X_{eng}$, into a demand signal, $R_{dmd}$, that actuators or other control components in gas turbine engine 14 may use to control engine control variables. The set of control laws may be selected and configured, for example, based on the characteristics of components, such as sensors, actuators, and propulsion components, of gas turbine engine 14. Control module 12 may receive the reference control signal, $R_{ref}$, from closed-loop reference module 6, the adaptation signal, $R_{adp}$, from adaptation module 16, and the engine state trajectory signal, $X_{eng}$, from gas turbine engine 14. Control module 12 may determine the demand signal, $R_{dmd}$, based on the reference control signal, $R_{ref}$, the adaptation signal, $R_{adp}$, and the engine state trajectory signal, $X_{eng}$. Control module 12 may output, to gas turbine engine 14, the demand signal, $R_{dmd}$, to control operation of at least one component of gas turbine engine 14. The demand signal, $R_{dmd}$, may represent the control signal to gas turbine engine 14 for the particular engine control variable.

Gas turbine engine 14 may receive the demand signal, $R_{dmd}$, from control module 12. Gas turbine engine 14 may include control components such as sensors configured to measure engine control variables and actuators to control engine control variables. While gas turbine engine 14 may be shown in FIG. 1 to receive demand signal, $R_{dmd}$, it may be understood that control components, such as actuators, may receive demand signal $R_{dmd}$. The actuators may receive the demand signal, $R_{dmd}$, and adjust one or more engine control variable based on demand signal, $R_{dmd}$. Sensors in gas turbine engine 14 may output the engine state trajectory signal, $X_{eng}$, to adaptation module 16 and control module 12. A variety of gas turbine engines may be used with MRAC 18 including, but not limited to, turboprop, turbofan, turboshaft, turbojet, and the like. As described above, in some examples, MRAC 18 may be used in a control system for another type of engine, such as an internal combustion engine or the like.

The system described above may be used in engine control systems to improve engine performance compared to a system that does not include a closed-loop reference module 6 or an adaptation module 16. Control module 12 may receive, from closed-loop reference module 6, the reference control signal, $R_{ref}$. Closed-loop reference module 6 may execute a reference model that represents operation of gas turbine engine 14 to determine the reference control signal, $R_{ref}$. By using a reference model to determine the reference control signal, $R_{ref}$, closed-loop reference module 6 may determine a reference control signal, $R_{ref}$, that is closer to the desired reference control signal, $R_{ref}$, for the selected request demand signal, $P_{req}$, and allow control module 12 to operate under smaller design margins compared to, for example, a controller that does not use a reference model to determine a control reference signal (e.g. open-loop reference model). Control module 12 may receive, from adaptation module 16, the adaptation signal, $R_{adp}$. Adaptation module 16 may determine the adaptation signal, $R_{adp}$, based on a difference between the reference state trajectory signal, $X_{ref}$, output by closed-loop reference module 6 and the engine state trajectory signal, $X_{eng}$, representative of actual operation of the engine. By determining the adaptation signal, $R_{adp}$, based on the difference between the reference state trajectory signal, $X_{ref}$, and the engine state trajectory signal, $X_{eng}$, adaptation module 16 may determine the adaptation signal, $R_{adp}$, to modify the control laws of control module 12 to more accurately control gas turbine engine 14 to track performance of the reference model compared to, for example, a controller that does not have a reference model to modify control laws. Control module 12 may receive the engine state trajectory signal, $X_{eng}$. Control module 12 may determine the demand signal based on the engine state trajectory signal, $X_{eng}$, the adaptation signal, $R_{adp}$, and the reference control signal, $R_{ref}$. Control module 12 may output the demand signal, $R_{dmd}$, to control operation of at least one component of gas turbine engine 14.

Figure 2:
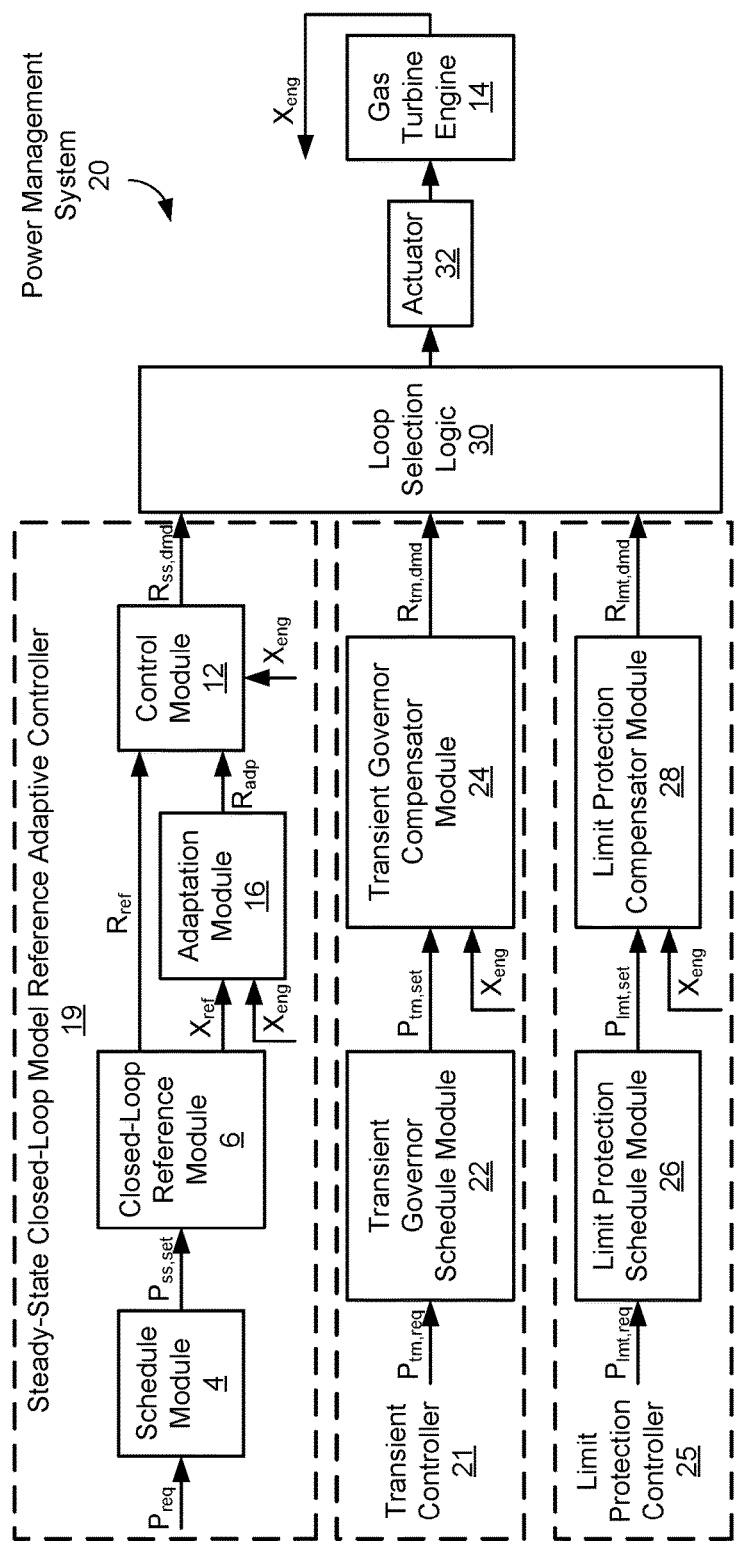
FIG. 2 is a conceptual and schematic block diagram illustrating an example power management system for controlling an engine that includes a closed-loop model reference adaptive controller for at least one of steady-state, transient, and limit protection operation.

Although FIG. 1 illustrates closed-loop MRAC 18 directly controlling operation of gas turbine engine 14, in some examples, closed-loop MRAC 18 may be implemented in a larger control system for a gas turbine engine. For example, a larger control system may include separate modules for steady-state operation, transient operation, and limit control. FIG. 2 is a conceptual and schematic block diagram illustrating an example power management system 20 for controlling gas turbine engine 14 in a system that may include steady-state, transient, and limit protection operation. While power management system 20 includes closed-loop model reference adaptive control for steady-state operation, the principles of closed-loop model reference adaptive control discussed in FIG. 1 may be used for transient or limit protection operation. For example, schedule module 4, closed-loop reference module 6, adaptation module 16, and controller 12 may be configured for transient operation and substituted for transient controller 21, for limit protection control and substituted for limit protection controller 25, or combinations thereof.

Power management system 20 may include steady-state closed-loop MRAC 19. Steady-state, closed-loop MRAC 19 may be configured to determine a steady-state demand signal, $R_{ss,dmd}$, from a request demand signal, $P_{req}$. Steady-state, closed-loop MRAC 19 may include schedule module 4, closed-loop reference module 6, control module 12, and adaptation module 16. Schedule module 4 may receive a demand request signal, $P_{req}$, from, for example, a control system (not shown). Schedule module 4 may determine a steady-state demand setpoint, $P_{ss,set}$, from the demand request signal and output the steady state demand setpoint, $P_{ss,set}$, to closed-loop reference module 6. Closed-loop reference module 6 may receive the steady state demand setpoint, $P_{ss,set}$, from schedule module 4. Closed-loop reference module 6 may determine the reference state trajectory signal, $X_{ref}$, and the reference control signal, $R_{ref}$, from the steady state demand setpoint, $P_{ss,set}$. Closed-loop reference module 6 may output the reference state trajectory signal, $X_{ref}$, to adaptation module 16 and the reference control signal, $R_{ref}$, to control module 12. Adaptation module 16 may receive the reference state trajectory signal, $X_{ref}$, from closed-loop reference module 6 and the engine state trajectory signal, $X_{eng}$, from gas turbine engine 14. Adaptation module 16 may determine the adaptation signal, $R_{adp}$, from the reference state trajectory signal, $X_{ref}$, and the engine state trajectory signal, $X_{eng}$, and output the adaptation signal, $R_{adp}$, to control module 12. Control module 12 may receive the adaptation signal, $R_{adp}$, from adaptation module 16 and the reference control signal, $R_{ref}$, from closed-loop reference module 6. Control module 12 may determine a steady-state demand signal, $R_{ss,dmd}$, from the reference control signal, $R_{ref}$, and the adaptation signal, $R_{adp}$, and output the steady-state demand signal, $R_{ss,dmd}$, to loop selection logic 30. Control module 12 may also receive the engine state trajectory signal, $X_{eng}$, from gas turbine engine 14 to adjust, for example, parameters of the control laws of control module 12. Schedule module 4, closed-loop reference module 6, controller 12, and adaptation module 16 may be operably similar to their respective components of FIG. 1 configured for steady-state operation. For example, schedule module 4 may have one or more steady-state power schedules that are configured for steady-state operation, while closed loop reference module 6 may be configured with one or more steady-state reference models for simulation of steady state operating conditions of gas turbine engine 14.

Power management system 20 may also include transient controller 21 to determine a transient demand signal, $R_{trn,dmd}$, from the demand request signal, $P_{req}$. Transient controller 21 may include transient governor schedule module 22 and transient governor compensator module 24.

Transient governor schedule module 22 may be configured to convert a transient demand request signal, $P_{trn,req}$, to transient controller 21, into a demand setpoint, $P_{trn,set}$, for one or more engine control variables associated with the transient demand request signal, $P_{trn,req}$. To perform this conversion, transient governor schedule module 22 may receive the transient demand request signal, $P_{trn,req}$, determine a transient demand setpoint, $P_{trn,set}$, based on the transient demand request signal, $P_{trn,req}$, and output the demand setpoint, $P_{trn,set}$, to transient governor compensator module 24. The transient demand request signal, $P_{trn,req}$, may be a signal from, for example, a control system controlled by an operator of an aircraft requesting a selected transient power demand for gas turbine engine 14. Schedule module 22 may include a list or database of gain schedules calibrated for particular transient demand setpoints, $P_{trn,set}$, of engine control variables.

Transient governor compensator module 24 may receive the transient demand setpoint, $P_{trn,set}$, from transient governor schedule module 22 and the engine state trajectory signal, $X_{eng}$, from gas turbine engine 14. Transient governor compensator module 24 may determine a transient demand signal, $R_{trn,dmd}$, based on the transient demand setpoint, $P_{trn,set}$, and the engine state trajectory signal, $X_{eng}$. Transient governor compensator module 24 may output the transient demand signal, $R_{trn,dmd}$, to loop selection logic 30.

Power management system 20 may further include limit protection controller 25 to determine a limit protection demand signal, $R_{lmt,dmd}$, from the limit protection demand request signal, $P_{lmt,req}$. Limit protection controller 25 may include limit protection schedule module 26 and limit protection compensator module 28.

Limit protection schedule module 26 may be configured to convert a limit protection demand request signal, $P_{lmt,req}$, to limit protection controller 25, into a limit protection demand setpoint, $P_{lmt,set}$, for one or more engine control variables associated with the limit protection demand request signal, $P_{lmt,req}$. To perform this conversion, limit protection schedule module 26 may receive the limit protection demand request signal, $P_{lmt,req}$, determine a limit protection demand setpoint, $P_{lmt,set}$, based on the limit protection demand request signal, $P_{lmt,req}$, and output the limit protection demand setpoint, $P_{lmt,set}$, to limit protection compensator module 28. Limit protection schedule module 26 may include a list or database of gain schedules calibrated for particular limit protection demand setpoints, $P_{lmt,set}$, of engine control variables.

Limit protection compensator module 28 may receive the limit protection demand setpoint, $P_{lmt,set}$, from limit protection schedule module 26 and the engine state trajectory signal, $X_{eng}$, from gas turbine engine 14. Limit protection compensator module 28 may determine a limit protection demand signal, $R_{lmt,dmd}$, based on the limit protection demand setpoint, $P_{lmt,set}$, and the engine state trajectory signal, $X_{eng}$. Limit protection compensator module 28 may output the limit protection demand signal, $R_{trn,dmd}$, to loop selection logic 30.

Loop selection logic 30 may be configured to select an appropriate demand signal for a particular gas turbine engine operating mode or combine two or more demand signals for a comprehensive control signal. Loop selection logic 30 may be configured to receive at least one of the steady state demand signal, $R_{ss,dmd}$, the transient demand signal, $R_{trn,dmd}$, or the limit protection demand signal, $R_{lmt,dmd}$. In some examples, loop selection logic 30 may select at least one of the steady state demand signal, $R_{ss,dmd}$, transient demand signal, $R_{trn,dmd}$, or limit protection demand signal, $R_{trn,dmd}$, for output to actuator 32. In other examples, loop selection logic 30 may combine at least two of the steady state demand signal, $R_{ss,dmd}$, transient demand signal, $R_{trn,dmd}$, or limit protection demand signal, $R_{lmt,dmd}$, into a combined demand signal. Loop selection logic 30 may output the demand signal to one or more actuator(s) 32 to control a component of gas turbine engine 14.

A system such as described above may be used to control an engine for steady-state, transient, and limit protection operation. For example, during steady state engine operation, a control system may control loop selection logic 30 to select steady state demand signal, $R_{ss,dmd}$, to output to actuator 32. If the demand request signal, $P_{req}$, increases or decreases, the control system may control loop selection logic 30 to select transient demand signal, $R_{trn,dmd}$, to output to actuator 32. If the engine exceeds a limit during either steady-state operation or transient operation, loop selection logic 30 may select limit protection demand signal, $R_{lmt,dmd}$, for output to actuator 32. By utilizing closed-loop MRAC 18 in a controller having at least one of steady-state, transient, and limit protection operation, the controller may operate an engine with reduced design margins for improved performance.

Figure 3:
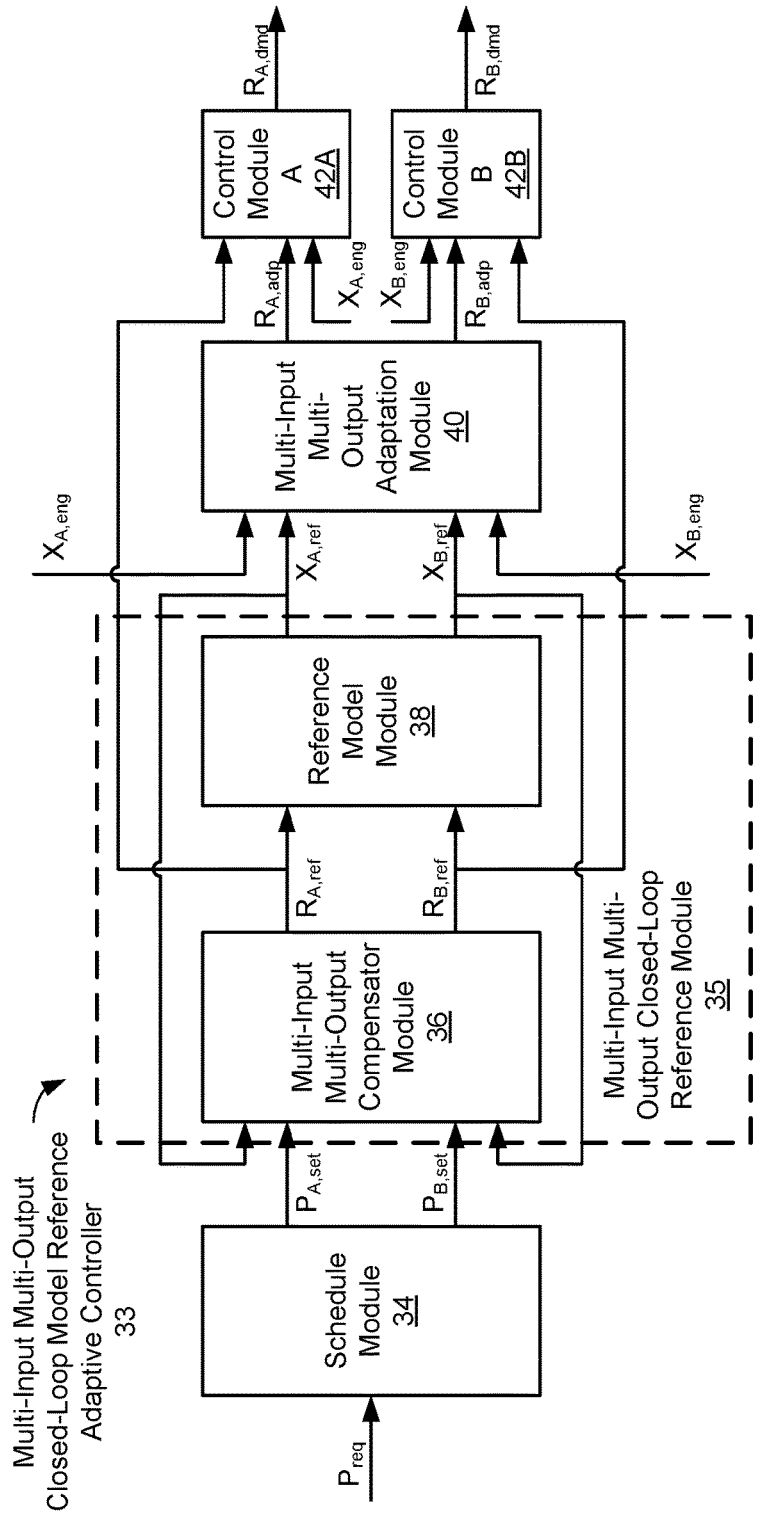
FIG. 3 is a conceptual and schematic block diagram illustrating an example closed-loop model reference adaptive controller for controlling multiple components of an engine for at least an engine control variable A and an engine control variable B.

While FIG. 1 and FIG. 2 illustrate closed-loop MRAC 18 and steady-state closed-loop MRAC 19 controlling one engine control variable, in some examples, closed-loop MRAC 18 may control more than one engine control variable (e.g., more than one engine component). For example, closed-loop MRAC 18 may include modules that are configured to receive multiple engine control variable inputs and determine multiple outputs based on relationships between the multiple engine control variable inputs. FIG. 3 is a conceptual and schematic block diagram illustrating an example multi-input multi-output (MIMO) closed-loop model reference adaptive controller 33 for controlling multiple components of a gas turbine engine (not shown) for at least an engine control variable A and an engine control variable B. Engine control variable A and engine control variable B may be any controllable variables in the operation of the engine. For example, engine control variable A may be fuel flow, and engine control variable B may be airflow. By controlling multiple engine control variables, closed-loop MRAC 33 may provide greater control and control flexibility over an engine. MIMO closed-loop MRAC 33 may include a schedule module 34, a MIMO closed-loop reference module 35, a MIMO adaptation module 40, and a control module A 42A, and a control module B 42B. MIMO closed-loop reference module 35 may include a MIMO compensator module 36 and a reference model module 38.

Schedule module 34 may be operably similar to or substantially the same as schedule module 4 of FIG. 1. Schedule module 34 may have a plurality of schedules to convert a demand request signal, $P_{req}$, to demand setpoints for a plurality of engine control variables. In the example of FIG. 3, schedule module 34 may receive the demand request signal, $P_{req}$. Schedule module 34 may determine a variable A demand setpoint, $P_{A,set}$, for an engine control variable A and a variable B demand setpoint, $P_{B,set}$, for an engine control variable B, based on the demand request signal, $P_{req}$. Schedule module 34 may output the variable A demand setpoint, $P_{A,set}$, and the variable B demand setpoint, $P_{B,set}$, to MIMO compensator module 36.

MIMO compensator module 36 may be configured to account for relationships between engine control variables in producing a reference control signal, $R_{A,ref}$ and $R_{B,ref}$, for each engine control variable. MIMO compensator module 36 may receive the variable A demand setpoint, $P_{A,set}$, the variable A reference state trajectory, $X_{A,ref}$, the variable B demand setpoint, $P_{B,set}$, and the variable B reference state trajectory, $X_{B,ref}$. The MIMO compensator module 36 may determine a variable A reference control signal, $R_{A,ref}$, and a variable B reference control signal, $R_{B,ref}$, based on the variable A demand setpoint, $P_{A,set}$, the variable A reference state trajectory, $X_{A,ref}$, the variable B demand setpoint, $P_{B,set}$, and the variable B reference state trajectory, $X_{B,ref}$. MIMO compensator module 36 may output the variable A reference control signal, $R_{A,ref}$, and the variable B reference control signal, $R_{B,ref}$, to control module A and control module B, respectively, and reference model module 38.

MIMO compensator module 36 may not be limited to determining the variable A reference control signal, $R_{A,ref}$, based only on variable A signals, but may use variable B signals, such as the variable B demand setpoint, $P_{B,set}$, and the variable B reference state trajectory signal, $X_{B,ref}$, in determining variable A reference control signal, $R_{A,ref}$; likewise, MIMO compensator module 36 may not be limited to determining the variable B reference control signal, $R_{B,ref}$, based only on variable B signals, but may use variable A signals, such as the variable A demand setpoint, $P_{A,set}$, and the variable A reference state trajectory, $X_{A,ref}$, in determining variable B reference control signal, $R_{B,ref}$. For example, variable A may be fuel flow, while variable B may be air flow. Fuel flow and air flow may not be independent, and adjusting one may require adjusting the other. By using model and schedule information from other engine control variables, MIMO compensator module 36 may determine reference control signals that take into account dependent relationships with other engine control variables.

Reference model module 38 may receive the variable A reference control signal, $R_{A,ref}$, and the variable B reference control signal, $R_{B,ref}$. Reference model module 38 may include reference models that include variable A, variable B, or both, as inputs for simulating operation of gas turbine engine 14. Reference model module 38 may determine the variable A reference state trajectory signal, $X_{A,ref}$, and the variable B reference state trajectory signal, $X_{B,ref}$, based on the variable A reference control signal, $R_{A,ref}$, and the variable B reference control signal, $R_{B,ref}$, and the reference model simulation operation of gas turbine engine 14. Reference model module 38 may output the variable A reference state trajectory signal, $X_{A,ref}$, and the variable B reference state trajectory signal, $X_{B,ref}$, to MIMO compensator module 36 and MIMO adaptation module 40.

MIMO adaptation module 40 may receive a variable A engine state trajectory signal, $X_{A,eng}$, the variable A reference state trajectory signal, $X_{A,ref}$, a variable B engine state trajectory signal, $X_{B,eng}$, and the variable B reference state trajectory signal, $X_{B,ref}$. MIMO adaptation module 40 may determine a variable A adaptation signal, $R_{A,adp}$, and a variable B adaptation signal, $R_{B,adp}$, based on the variable A engine state trajectory signal, $X_{A,eng}$, the variable A reference state trajectory signal, $X_{A,ref}$, the variable B engine state trajectory signal, $X_{B,eng}$, the variable B reference state trajectory signal, $X_{B,ref}$, and adaptation laws related to variables A and B. MIMO adaptation module 40 may output the variable A adaptation signal, $R_{A,adp}$, and the variable B adaptation signal, $R_{B,adp}$, to control module A and control module B, respectively.

MIMO adaptation module 40 may not be limited to determining the variable A adaptation signal, $R_{A,adp}$, based only on variable A signals, but may use variable B signals, such as the variable B engine state trajectory signal, $X_{B,eng}$, and the variable B reference state trajectory signal, $X_{B,ref}$; likewise, MIMO adaptation module 40 may not be limited to determining the variable B adaptation signal, $R_{B,adp}$, based only on variable A signals, but may use variable A signals, such as the variable A engine state trajectory signal, $X_{A,eng}$, and the variable A reference state trajectory signal, $X_{A,ref}$. By using model and engine information from other engine control variables, MIMO adaptation module 40 may determine an engine control variable adaptation signal that takes into account dependent relationships with other engine control variables. In some examples, adaptation laws of MIMO adaptation module 40 may use any one of the variable A engine state trajectory signal, $X_{A,eng}$, the variable A reference state trajectory signal, $X_{A,ref}$, the variable B engine state trajectory signal, $X_{B,eng}$, and the variable B reference state trajectory signal, $X_{B,ref}$.

Control module A 42A may receive the variable A reference control signal, $R_{A,ref}$, from MIMO compensator module 36, the variable A adaptation signal, $R_{A,adp}$, from MIMO adaptation module 40, and the variable A engine state trajectory signal, $X_{A,eng}$, from gas turbine engine 14 (not shown). Control module A may determine a variable A demand signal, $R_{A,dmd}$, based on the variable A reference control signal, $R_{A,ref}$, the variable A adaptation signal, $R_{A,adp}$, the variable A engine state trajectory signal, $X_{A,eng}$, and one or more control laws relating the inputs to the variable A demand signal, $R_{A,dmd}$. Control module A may output the variable A demand signal, $R_{A,dmd}$, e.g., to gas turbine engine 14 (not shown) or loop selection logic 30 (FIG. 2) to control an engine component associated with variable A. Control module B 42B may be operably similar to control module A 42A, but may control variable B based on the variable B reference control signal, $R_{B,ref}$, the variable B adaptation signal, $R_{B,adp}$, the variable B engine state trajectory signal, $X_{B,eng}$, and one or more control laws relating the inputs to the variable B demand signal, $R_{B,dmd}$.

MIMO closed-loop MRAC 33 may be configured to control an engine based on multiple variables. Control module A 42A may receive, from MIMO closed-loop reference module 35, the variable A reference control signal, $R_{A,ref}$. Control module B 42B may receive, from MIMO closed-loop reference module 35, the variable B reference control signal, $R_{B,ref}$. MIMO closed-loop reference module 35 may execute one or more reference models that represent operation of an engine to determine the variable A reference control signal, $R_{A,ref}$, and the variable B reference control signal, $R_{B,ref}$. Control module A 42A may receive, from MIMO adaptation module 40, the variable A adaptation signal, $R_{A,adp}$. Control module B 42B may receive, from MIMO adaptation module 40, the variable B adaptation signal, $R_{B,adp}$. MIMO adaptation module 40 may determine the variable A adaptation signal, $R_{A,adp}$, based on the difference between the variable A reference state trajectory signal, $X_{A,ref}$, output by MIMO closed-loop reference module 35 and the variable A engine state trajectory signal, $X_{A,eng}$. MIMO adaptation module 40 may also determine the variable B adaptation signal, $R_{B,adp}$, based on the difference between the variable B reference state trajectory signal, $X_{B,ref}$, output by MIMO closed-loop reference module 35 and the variable B engine state trajectory signal, $X_{B,eng}$. Control module A 42A may receive the variable A engine state trajectory signal, $X_{A,eng}$. Control module B 42B may receive the variable B engine state trajectory signal, $X_{B,eng}$. Control module A 42A may determine a variable A demand signal, $R_{A,dmd}$, based on the variable A engine state trajectory signal, $X_{A,eng}$, the variable A adaptation signal, $R_{A,adp}$, and the variable A reference control signal, $R_{A,ref}$. Control module A 42A may output the variable A demand signal, $R_{A,dmd}$, to the engine. Control module B 42B may determine a variable B demand signal, $R_{B,dmd}$, based on the variable B engine state trajectory signal, $X_{B,eng}$, the variable B adaptation signal, $R_{B,adp}$, and the variable B reference control signal, $R_{B,ref}$. Control module B 42B may output the variable B demand signal, $R_{B,dmd}$, to the engine. By using reference models and adaptation laws that use multiple engine control variables, MIMO closed-loop reference module 35 and MIMO adaptation module 36 may determine control reference signals and adaptation signals, respectively, that take into account dependent relationships between engine control variables.

While FIGS. 1-3 illustrate aspects of model reference adaptive control, power management system 2 may also include model-based engine control for estimating unmeasured engine parameters associated with engine performance. For example, power management system 2 may include one or more modules for adaptive, model-based engine control to estimate unmeasured engine parameters for steady-state, transient, and limit protection systems. FIG. 4 is a conceptual and schematic block diagram illustrating an example power management system 44 that includes steady-state closed-loop MRAC 19, transient controller 21, limit protection controller 25, and model-based engine module 50.

Model-based engine module 50 may be configured to estimate engine performance by tracking engine parameters and estimating unmeasured engine parameters using an adaptive, real-time engine model (RTEM). Certain engine parameters may be unmeasurable, yet may be useful for controlling engine performance when applied to MRAC. Steady-state closed-loop MRAC 19, transient controller 21, limit protection controller 25 may use the estimated engine parameters to modify power demand to more efficiently or safely operate the gas turbine engine. Unmeasured engine parameters may include, but are not limited to, specific fuel consumption, high pressure turbine entry temperature, compressor surge margin, and thrust. Model-based engine module 50 may estimate one or more unmeasured engine parameters based on actuator information, including an actuator signal, $X_{act}$, and engine information, including an engine state trajectory signal, $X_{eng}$. Engine information may include, but is not limited to, fuel flow rate, air flow rate, actuator position, temperatures, pressures, and the like. Actuator information may include, but is not limited to, inlet vanes position, fuel control valve position, exhaust nozzles position, and the like.

Model-based engine module 50 may receive one or more actuator signals, $X_{act}$, from actuator 32, and one or more engine state trajectory signals, $X_{eng}$ from gas turbine engine 14. Model-based engine module 50 may estimate unmeasured engine parameters to determine one or more engine parameter estimate signals, $X_{est}$, based on the actuator signal, $X_{act}$, and the engine state trajectory signal, $X_{eng}$. Model-based engine module 50 may use the RTEM based on gas turbine engine 14 to estimate the unmeasured engine parameters. Model-based engine module 50 may update the RTEM to reflect changes in performance of gas turbine engine 14. Model-based engine module 50 may output the engine parameter estimate signals, $X_{est}$, to one or more of steady-state closed-loop MRAC 19, transient controller 21, and limit protection module 25. Steady-state closed-loop MRAC 19, transient controller 21, limit protection module 25, or any combination thereof, may utilize the engine parameter estimate signals, $X_{est}$, for controlling gas turbine engine 14, as will be described below.

By estimating unmeasured engine parameters and outputting the corresponding engine parameter estimate signals to other components of power management system 44, Model-based engine module 50 may provide power management system 44 with improved performance due to reduced design margins. By updating the RTEM based on the measured parameter estimates and the engine state trajectory signals, $X_{eng}$, model-based engine module 50 may account for deterioration or changes in performance of gas turbine engine 14 for more efficient gas turbine engine operation.

Model-based engine module 50 may include tracking module 46 to use measured engine parameter estimate signals, $X_{est}$, and engine state trajectory signals, $X_{eng}$, and produce a RTEM update based on the tracked measured engine parameter estimate signals, $X_{est}$, and engine state trajectory signals, $X_{eng}$. Tracking module 46 may receive an engine state trajectory signal, $X_{eng}$, from gas turbine engine 14 and an engine variable estimate signal, $X_{est}$, from adaptive engine model module 48. In some examples, tracking module 46 may track the engine parameter estimate signal, $X_{est}$, and the engine state trajectory signal, $X_{eng}$, over a period of time to determine any changes in engine performance. Tracking module 46 may determine a tracking update signal, $X_{upd}$, based on the engine state trajectory signal, $X_{eng}$, and the engine parameter estimate signal, $X_{est}$. Tracking module 46 may output the tracking update signal, $X_{upd}$, to adaptive engine model module 48.

Model-based engine module 50 may include adaptive engine model module 48 to simulate gas turbine engine 14, determine one or more engine parameter estimate signals, $X_{est}$, using the RTEM, and update the RTEM based on the tracking update signal, $X_{upd}$. Adaptive engine model module 48 may receive the tracking update signal, $X_{upd}$, from tracking module 46 and an actuator signal, $X_{act}$, from actuator(s) 32. Adaptive engine model module 48 may determine the engine variable estimate signal, $X_{est}$, based on the actuator signal, $X_{act}$, and the tracking update signal, $X_{upd}$. Adaptive engine model module 48 may output the engine parameter estimate signal, $X_{est}$, to steady-state closed-loop MRAC 19, transient controller 21, limit protection controller 25, or any combination thereof.

Power management system 44 may include steady-state closed-loop MRAC 19, transient controller 21, and limit protection controller 25. Steady-state closed-loop MRAC 19, transient controller 21, and limit protection controller 25 may be operably similar to their respective components of FIG. 1 and FIG. 2 configured for model-based engine control.

Steady-state, closed-loop MRAC 19 may include schedule module 4, closed-loop reference module 6, control module 12, and adaptation module 16. Schedule module 4 may receive a demand request signal, $P_{req}$, from, for example, a control system (not shown). Schedule module 4 may determine a steady-state demand setpoint, $P_{ss,set}$, from the demand request signal and output the steady state demand setpoint, $P_{ss,set}$, to closed-loop reference module 6.

In some examples, closed-loop reference module 6 may receive the steady state demand setpoint, $P_{ss,set}$, from schedule module 4. Closed-loop reference module 6 may determine the reference state trajectory signal, $X_{m,ref}$, the reference control signal, $R_{ref}$, and a reference parameter trajectory signal, $X_{e,ref}$, from the steady state demand setpoint, $P_{ss,set}$. The reference parameter trajectory signal, $X_{e,ref}$, may represent the simulated response of closed-loop reference module 6 to the reference control signal, $R_{ref}$, for an unmeasured engine parameter, such as the unmeasured engine parameter corresponding to engine parameter estimate signal, $X_{est}$. Closed-loop reference module 6 may include a reference model configured to output unmeasured engine parameters. Closed-loop reference module 6 may output the reference state trajectory signal, $X_{m,ref}$, and the reference parameter trajectory signal, $X_{e,ref}$, to adaptation module 16, and the reference control signal, $R_{ref}$, to control module 12.

In some examples, adaptation module 16 may receive the reference state trajectory signal, $X_{m,ref}$, and the reference parameter trajectory signal, $X_{e,ref}$, from closed-loop reference module 6, the engine state trajectory signal, $X_{eng}$, from gas turbine engine 14, and the engine parameter estimate signal, $X_{est}$, from model-based engine module 50. Adaptation module 16 may determine the adaptation signal, $R_{adp}$, from the reference state trajectory signal, $X_{m,ref}$, the reference parameter trajectory signal, $X_{e,ref}$, the engine state trajectory signal, $X_{eng}$, and the engine parameter estimate signal, $X_{est}$. In some examples, adaptation module 16 may determine a difference between the reference parameter trajectory signal, $X_{e,ref}$, and the engine parameter estimate signal, $X_{est}$, and determine the adaptation signal, $X_{adp}$, based on at least the difference between the reference parameter trajectory signal, $X_{e,ref}$, and the engine parameter estimate signal, $X_{est}$. By using the engine parameter estimate signal, $X_{est}$, and the reference parameter trajectory signal, $X_{e,ref}$, to determine the adaptation signal, $R_{adp}$, adaptation module 16 may create adjustments to control module 12 that account for unmeasured engine parameters estimated by model-based engine module 50. Adaptation module 16 may output the adaptation signal, $R_{adp}$, to control module 12.

Control module 12 may receive the adaptation signal, $R_{adp}$, from adaptation module 16 and the reference control signal, $R_{ref}$, from closed-loop reference module 6. Control module 12 may determine a steady-state demand signal, $R_{ss,dmd}$, from the reference control signal, $R_{ref}$, and the adaptation signal, $R_{adp}$, and output the steady-state demand signal, $R_{ss,dmd}$, to loop selection logic 30. In some examples, control module 12 may also receive the engine parameter estimate signal, $X_{est}$, from the model-based engine module 50 and the engine state trajectory signal, $X_{eng}$, from gas turbine engine 14, to adjust, for example, parameters of the control laws of control module 12.

Power management system 44 may also include transient controller 21 to determine a transient demand signal, $R_{trn,dmd}$, from the transient demand request signal, $P_{trn,req}$. Transient controller 21 may include transient governor schedule module 22 and transient governor compensator module 24.

Transient governor schedule module 22 may be configured to convert the transient demand request signal, $P_{trn,req}$, to transient controller 21, into a transient demand setpoint, $P_{trn,set}$, for one or more engine control variables associated with the transient demand request signal, $P_{trn,req}$. To perform this conversion, transient governor schedule module 22 may receive the transient demand request signal, $P_{trn,req}$, determine the transient demand setpoint, $P_{trn,set}$, based on the transient demand request signal, $P_{trn,req}$, and output the transient demand setpoint, $P_{trn,set}$, to transient governor compensator module 24.

Transient governor compensator module 24 may receive the transient demand setpoint, $P_{trn,set}$, from transient governor schedule module 22, the engine state trajectory signal, $X_{eng}$, from gas turbine engine 14, and the engine parameter estimate signal, $X_{est}$, from model-based engine module 50. Transient governor compensator module 24 may determine a transient demand signal, $R_{trn,dmd}$, based on the transient demand setpoint, $P_{trn,set}$, the engine state trajectory signal, $X_{eng}$, and the engine parameter estimate signal, $X_{est}$. Transient governor compensator module 24 may output the transient demand signal, $R_{trn,dmd}$, to loop selection logic 30. By using the engine parameter estimate signal, $X_{est}$, to determine the transient demand signal, $R_{trn,dmd}$, transient governor compensator module 24 may control transient operating conditions based on important, but unmeasurable, engine parameters.

Power management system 44 may further include limit protection controller 25 to determine a limit protection demand signal, $R_{lmt,dmd}$, from a limit protection demand request signal, $P_{lmt,req}$. Limit protection controller 25 may include limit protection schedule module 26 and limit protection compensator module 28.

Limit protection schedule module 26 may be configured to convert the limit protection demand request signal, $P_{lmt,req}$, to limit protection controller 25, into a demand setpoint, $P_{lmt,set}$, for one or more engine control variables associated with the limit protection demand request signal, $P_{lmt,req}$. To perform this conversion, limit protection schedule module 26 may receive the limit protection demand request signal, $P_{lmt,req}$, determine a demand setpoint, $P_{lmt,set}$, based on the limit protection demand request signal, $P_{lmt,req}$, and output the limit protection demand setpoint, $P_{lmt,set}$, to limit protection compensator module 28.

Limit protection compensator module 28 may receive the limit protection demand setpoint, $P_{lmt,set}$, from limit protection schedule module 26, the engine state trajectory signal, $X_{eng}$, from gas turbine engine 14, and the engine parameter estimate signal, $X_{est}$, from model-based engine module 50. Limit protection compensator module 28 may determine a limit protection demand signal, $R_{lmt,dmd}$, based on the limit protection demand setpoint, $P_{lmt,set}$, the engine state trajectory signal, $X_{eng}$, and the engine parameter estimate signal, $X_{est}$. Limit protection compensator module 28 may output the limit protection demand signal, $R_{lmt,dmd}$, to loop selection logic 30. By using the engine parameter estimate signal, $X_{est}$, to determine the limit protection demand signal, $R_{lmt,dmd}$, limit protection compensator module 28 may enforce performance limits based on unmeasurable engine parameters that may be related, for example, to safe operation of gas turbine engine 14.

Loop selection logic 30 may be configured to select an appropriate demand signal for a particular gas turbine engine operating mode or combine two or more demand signals for a comprehensive control signal. Loop selection logic 30 may be configured to receive at least one of the steady state demand signal, $R_{ss,dmd}$, the transient demand signal, $R_{trn,dmd}$, or the limit protection demand signal, $R_{lmt,dmd}$. In some examples, loop selection logic 30 may select at least one of the steady state demand signal, $R_{ss,dmd}$, transient demand signal, $R_{trn,dmd}$, or limit protection demand signal, $R_{lmt,dmd}$, for output to actuator 32. In other examples, loop selection logic 30 may combine at least two of the steady state demand signal, $R_{ss,dmd}$, transient demand signal, $R_{trn,dmd}$, or limit protection demand signal, $R_{lmt,dmd}$, into a combined demand signal. Loop selection logic 30 may output the demand signal to one or more actuator(s) 32 to control a component of gas turbine engine 14.

A control system, such as power management system 44, that uses model-based engine module 50 to estimate unmeasured engine parameters for control system components may more accurately control an engine based on estimated unmeasured engine parameters. Model-based engine module 50 may determine, using the RTEM, the engine parameter estimate signal, $X_{est}$, based on the actuator signal, $X_{act}$, and the engine state trajectory signal, $X_{eng}$. The engine parameter estimate signal, $X_{est}$, represents an unmeasured engine parameter. Model-based engine module 50 may track the engine parameter estimate signal, $X_{est}$, and the engine state trajectory signal, $X_{eng}$, to determine changes in engine performance. Model-based engine module 50 may update the RTEM based on the engine parameter estimate signal, $X_{est}$, and the engine state trajectory signal, $X_{eng}$, to more accurately reflect engine performance. In some examples, model-based engine module 50 may track the engine parameter estimate signal, $X_{est}$, and the engine state trajectory signal, $X_{eng}$, over a period of time to determine any changes in engine performance. Adaptation module 16 may determine the adaptation signal, $R_{adp}$, based on the difference between the reference parameter trajectory signal, $X_{e,ref}$, and the engine parameter estimate signal, $X_{est}$, which control module 12 may use to adjust the control laws.

Figure 5:
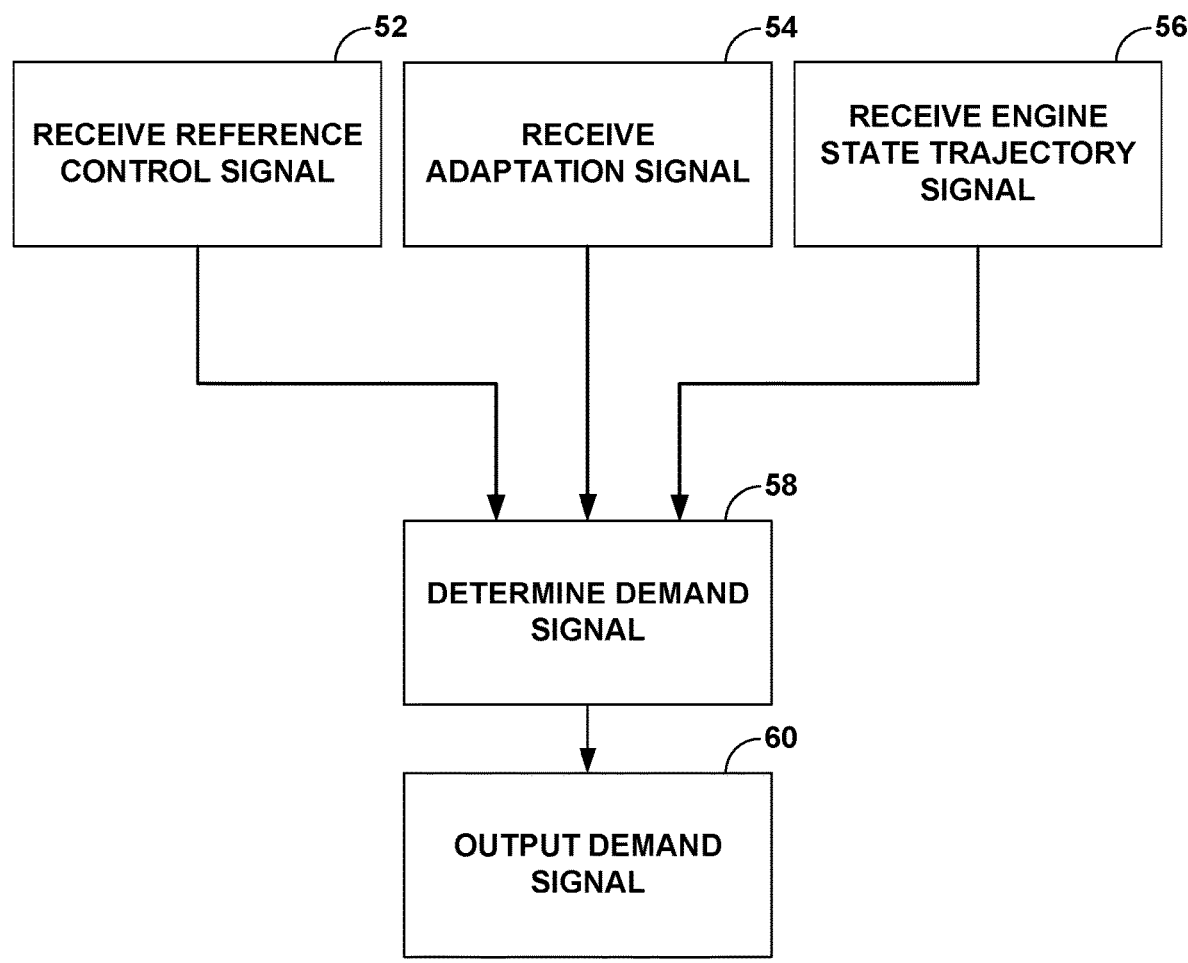
FIG. 5 is a flow diagram illustrating an example technique for managing power in an engine.

The systems of FIGS. 1-4 may be used to manage power in an engine. However, other control systems may be used to manage power. FIG. 5 is a flow diagram illustrating an example technique for managing power in an engine. FIG. 5 will be described with concurrent reference to FIG. 1; however, the technique of FIG. 5 may be used in a variety of control systems.

Control module 12 receives a reference control signal from closed-loop reference module 6 (52). Control module 12 also receives an adaptation signal from adaptation module 16 (54). Adaptation module 16 may determine the adaptation signal based on a difference between a reference state trajectory signal output by closed-loop reference module 6 and an engine state trajectory signal representative of actual operation of gas turbine engine 14. Control module 12 also receives the engine state trajectory signal (56). Control module 12 determines a demand signal based on the engine state trajectory signal, the adaptation signal, and the reference control signal (58). Control module 12 outputs, to gas turbine engine 14 or a loop selection logic, the demand signal to control operation of at least one component of gas turbine engine 14.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
    receiving, by a control module, from a closed-loop reference module, a reference control signal, wherein the closed-loop reference module executes a reference model that represents operation of an engine, and wherein the reference control signal represents a measurable, manipulated engine variable associated with operation of the engine that is determined by the closed-loop reference module based on an engine state trajectory signal;
    receiving, by the control module, from an adaptation module, an adaptation signal determined by the adaptation module based on a difference between the reference state trajectory signal output by the closed-loop reference module and an engine state trajectory signal output by the engine, wherein the engine state trajectory signal is representative of actual operation of the engine;
    receiving, by the control module, from the engine, the engine state trajectory signal;
    determining, by the control module, a demand signal based on the engine state trajectory signal, the adaptation signal, and the reference control signal; and
    outputting, by the control module, the demand signal to control operation of at least one component of the engine.

2. The method of claim 1, further comprising:
    determining, by a compensator module, the reference control signal based on a demand setpoint and the reference state trajectory signal; and
    determining, by the reference model module, the reference state trajectory signal based on the reference control signal using the reference model.

3. The method of claim 2, further comprising converting, by a schedule module, a demand request signal into the demand setpoint based on one or more gain schedules.

4. The method of claim 2, wherein the reference model includes a piecewise-linear engine model, a nonlinear thermodynamic cycle engine model, or any input/output functional form configured to represent engine behavior.

5. The method of claim 1, wherein:
    the adaptation module further determines the adaptation signal based on a difference between a reference parameter trajectory signal output by the closed-loop reference module and an engine parameter estimate signal representing an unmeasured engine parameter.

6. The method of claim 5, further comprising determining, by a model-based engine module, using an adaptive engine model, the engine parameter estimate signal based on an actuator signal and the engine state trajectory signal.

7. The method of claim 6, further comprising:
    tracking, by the model-based engine module, the engine parameter estimate signal and the engine state trajectory signal; and
    updating, by the model-based engine module, the adaptive engine model based on the tracked engine parameter estimate signal and the engine state trajectory signal.

8. The method of claim 5, wherein the engine parameter estimate signal represents at least one of specific fuel consumption, high pressure turbine entry temperature, compressor surge margin, or thrust.

9. The method of claim 2, wherein the control module is a first control module, the reference control signal is a first reference control signal, the demand setpoint is a first demand setpoint, the adaptation signal is a first adaptation signal, the engine state trajectory signal is a first engine state trajectory signal, the demand signal is a first demand signal, further comprising:
    receiving, by a second control module, from the closed-loop reference module, a second reference control signal, wherein the second reference control signal is based on a second demand setpoint;
    receiving, by the second control module, from the adaptation module, a second adaptation signal, wherein the adaptation module determines the second adaptation signal based on the difference between a second reference state trajectory signal and a second engine state trajectory signal;
    receiving, by the second control module, a second engine state trajectory signal;
    determining, by the second control module, a second demand signal based on the second engine state trajectory signal, the second adaptation signal, and the second reference control signal; and
    outputting, by the second control module, to the gas turbine engine, the second demand signal to control operation of at least one component of the gas turbine engine, and
    wherein the first demand signal and the second demand signal control different components of the gas turbine engine.

10. The method of claim 1, wherein the demand signal is a first demand signal, further comprising:
    receiving, by loop selection logic, the first demand signal, wherein the first demand signal represents one of steady-state, transient, and limit protection operation;
    receiving, by the loop selection logic, a second demand signal, wherein the second demand signal represents another one of steady-state, transient, and limit protection operation;
    selecting or combining, by the loop selection logic, the first demand signal or the second demand signal, or some combination of first and second demand signals; and
    outputting, by the loop selection logic, the first demand signal, the second demand signal, or the combination.

11. A system, comprising:
one or more processors configured to execute a closed-loop reference module, an adaptation module, and a control module,
wherein the closed-loop reference module is configured to determine a reference control signal and determine a reference state trajectory signal, wherein the closed-loop reference module executes a reference model that represents operation of an engine, and wherein the reference control signal represents a measurable, manipulated engine variable associated with operation of the engine that is determined by the closed-loop reference module based on an engine state trajectory signal;
wherein the adaptation module is configured to determine an adaptation signal based on a difference between the reference state trajectory signal output by the closed-loop reference module and an engine state trajectory signal output by the engine, wherein the engine state trajectory signal is representative of actual operation of the engine; and
wherein the control module is configured to:
receive, from the closed-loop reference module, the reference control signal;
receive, from the adaptation module, the adaptation signal;
receive, from the engine, the engine state trajectory signal;
determine a demand signal based on the engine state trajectory signal, the adaptation signal, and the reference control signal; and
output the demand signal to control operation of at least one component of the engine.

12. The system of claim 11, wherein the closed-loop reference module comprises:
a compensator module configured to determine the reference control signal based on a demand setpoint and the reference state trajectory; and
a reference model module configured to determine the reference state trajectory signal based on the reference control signal using the reference model.

13. The system of claim 12, wherein the reference model includes a piecewise-linear engine model, a nonlinear thermodynamic cycle engine model, or any input/output functional form configured to represent engine behavior.

14. The system of claim 11, wherein the adaptation module is further configured to:
receive, from a model-based engine module, an engine parameter estimate signal representing an unmeasured engine parameter;
receive, from the closed-loop reference module, a reference parameter trajectory signal, and
determine the adaptation signal based on the engine parameter estimate signal and the reference parameter trajectory signal.

15. The system of claim 14, further comprising the model-based engine module, wherein the model-based engine module is configured to determine, using an adaptive engine model, the engine parameter estimate signal based on an actuator signal and the engine state trajectory signal.

16. The system of claim 15, wherein the model-based engine module is further configured to:
track the engine parameter estimate signal and the engine state trajectory signal; and
update the adaptive engine model based on the tracked engine parameter estimate signal and the engine state trajectory signal.

17. The system of claim 14, wherein the engine parameter estimate signal represents at least one of specific fuel consumption, high pressure turbine entry temperature, compressor surge margin, and thrust.

18. The system of claim 11, wherein the control module is a first control module, the reference control signal is a first reference control signal, the demand setpoint is a first demand setpoint, the adaptation signal is a first adaptation signal, the engine state trajectory signal is a first engine state trajectory signal, the demand signal is a first demand signal, further comprising a second control module configured to:
receive, from the closed-loop reference module, a second reference control signal, wherein the second reference control signal is based on a second demand setpoint;
receive, from the adaptation module, a second adaptation signal, wherein the adaptation module is configured to determine the adaptation signal based on the difference between a second reference state trajectory signal and a second engine state trajectory signal;
receive a second engine state trajectory signal;
determine a second demand signal based on the second engine state trajectory signal, the second adaptation signal, and the second reference control signal; and
output, to the gas turbine engine, the second demand signal to control operation of at least one component of the gas turbine engine, and
wherein the demand signal and the second demand signal control different components of the gas turbine engine.

19. The system of claim 11, wherein the demand signal is a first demand signal, further comprising loop selection logic configured to:
receive the first demand signal, wherein the first demand signal represents one of steady-state, transient, and limit protection operation;
receive a second demand signal, wherein the second demand signal represents another one of steady-state, transient, and limit protection operation;
select or combine the first demand signal or the second demand signal, or some combination of first and second demand signals; and
output, the selected first demand signal, the second demand signal, or some combination of first and second demand signals.

20. A non-transitory computer-readable storage medium storing instructions that, when executed, cause a processor to:
receive, by a control module, from a closed-loop reference module, a reference control signal, wherein the closed-loop reference module executes a reference model that represents operation of an engine, and wherein the reference control signal represents a measurable, manipulated engine variable associated with operation of the engine that is determined by the closed-loop reference module based on an engine state trajectory signal;
receive, by the control module, from an adaptation module, an adaptation signal determined by the adaptation module based on a difference between the reference state trajectory signal output by the closed-loop reference module and an engine state trajectory signal output by the engine, and wherein the engine state trajectory signal is representative of actual operation of the engine;
receive, by the control module, from the engine, the engine state trajectory signal;

determine, by the control module, a demand signal based on the engine state trajectory signal, the adaptation signal, and the reference control signal; and output, by the control module, to the engine, the demand signal to control operation of at least one component of the engine.

\* \* \* \* \*